(12) United States Patent
Cartwright et al.

(10) Patent No.: US 12,207,073 B2
(45) Date of Patent: *Jan. 21, 2025

(54) METHOD OF RENDERING ONE OR MORE CAPTURED AUDIO SOUNDFIELDS TO A LISTENER

(71) Applicant: DOLBY LABORATORIES LICENSING CORPORATION, San Francisco, CA (US)

(72) Inventors: Richard J. Cartwright, Killara (AU); David S. McGrath, Rose Bay (AU); Glenn N. Dickins, Como (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,498

(22) Filed: Sep. 18, 2023

(65) Prior Publication Data
US 2024/0098435 A1    Mar. 21, 2024

Related U.S. Application Data

(63) Continuation of application No. 17/397,887, filed on Aug. 9, 2021, now Pat. No. 11,770,666, which is a
(Continued)

(51) Int. Cl.
*H04S 1/00* (2006.01)
*H04M 3/56* (2006.01)
(Continued)

(52) U.S. Cl.
CPC .............. *H04S 1/005* (2013.01); *H04M 3/568* (2013.01); *H04R 3/12* (2013.01); *H04R 5/033* (2013.01);
(Continued)

(58) Field of Classification Search
CPC . H04S 1/005; H04S 7/30; H04S 7/304; H04S 2400/01; H04S 2400/03;
(Continued)

(56) References Cited

U.S. PATENT DOCUMENTS 5,594,800 A    1/1997    Gerzon
5,742,689 A    4/1998    Tucker
(Continued)

FOREIGN PATENT DOCUMENTS

| WO | 2006052188 A1 | 5/2006 |
| WO | 2012/168765 | 12/2012 |
| WO | 2013006330 | 1/2013 |

OTHER PUBLICATIONS

Haas, H. "The Influence of a Single Echo on the Audibility of Speech" JAES vol. 20, Issue 2, pp. 146-159, Mar. 1972.
(Continued)

*Primary Examiner* — Yosef K Laekemariam

(57) ABSTRACT

A computer implemented system for rendering captured audio soundfields to a listener comprises apparatus to deliver the audio soundfields to the listener. The delivery apparatus delivers the audio soundfields to the listener with first and second audio elements perceived by the listener as emanating from first and second virtual source locations, respectively, and with the first audio element and/or the second audio element delivered to the listener from a third virtual source location. The first virtual source location and the second virtual source location are perceived by the listener as being located to the front of the listener, and the third virtual source location is located to the rear or the side of the listener.

6 Claims, 9 Drawing Sheets

Related U.S. Application Data continuation of application No. 16/908,568, filed on Jun. 22, 2020, now Pat. No. 11,089,421, which is a continuation of application No. 16/518,666, filed on Jul. 22, 2019, now Pat. No. 10,694,305, which is a continuation of application No. 16/009,154, filed on Jun. 14, 2018, now Pat. No. 10,362,420, which is a continuation of application No. 15/480,163, filed on Apr. 5, 2017, now Pat. No. 10,003,900, which is a continuation of application No. 14/774,943, filed as application No. PCT/US2014/023275 on Mar. 11, 2014, now Pat. No. 9,648,439.

(60) Provisional application No. 61/879,776, filed on Sep. 19, 2013, provisional application No. 61/843,176, filed on Jul. 5, 2013, provisional application No. 61/777,151, filed on Mar. 12, 2013.

(51) Int. Cl.
*H04R 3/12* (2006.01)
*H04R 5/033* (2006.01)
*H04R 5/04* (2006.01)
*H04S 7/00* (2006.01)

(52) U.S. Cl.
CPC ............... *H04R 5/04* (2013.01); *H04S 7/30* (2013.01); *H04S 7/304* (2013.01); *H04S 2400/01* (2013.01); *H04S 2400/03* (2013.01); *H04S 2400/11* (2013.01); *H04S 2420/01* (2013.01); *H04S 2420/11* (2013.01)

(58) Field of Classification Search
CPC ............ H04S 2400/11; H04S 2420/01; H04S 2420/11; H04S 1/00; H04S 7/00; H04M 3/568; H04M 3/56; H04R 3/12; H04R 5/033; H04R 5/04
See application file for complete search history.

(56) References Cited

U.S. PATENT DOCUMENTS

| | | | |
|---|---|---|---|
| 5,757,927 A | 5/1998 | Gerzon et al. | |
| 6,259,795 B1 | 7/2001 | McGrath | |
| 6,628,787 B1 | 9/2003 | McGrath | |
| 6,801,627 B1 | 10/2004 | Kobayashi | |
| 6,853,732 B2 | 2/2005 | Scofield | |
| 7,158,642 B2 | 1/2007 | Tsuhako | |
| 7,167,567 B1 | 1/2007 | Sibbald et al. | |
| 7,215,782 B2 | 5/2007 | Chen | |
| 7,231,054 B1 | 6/2007 | Jot | |
| 7,333,622 B2 | 2/2008 | Algazi | |
| 7,433,479 B2 | 10/2008 | Sato | |
| 7,660,424 B2 | 2/2010 | Davis | |
| 7,817,806 B2 | 10/2010 | Nakano | |
| 7,936,887 B2 | 5/2011 | Smyth | |
| 8,073,125 B2 | 12/2011 | Zhang | |
| 8,130,977 B2 | 3/2012 | Chu | |
| 8,204,262 B2 | 6/2012 | Aoyagi | |
| 8,270,616 B2 | 9/2012 | Slamka | |
| 8,335,331 B2 | 12/2012 | Johnston | |
| 8,340,315 B2 | 12/2012 | Kantola | |
| 8,351,589 B2 | 1/2013 | Acero | |
| 8,374,365 B2 | 2/2013 | Goodwin | |
| 2004/0247144 A1 | 12/2004 | Nelson | |
| 2006/0056638 A1 | 3/2006 | Schobben | |
| 2007/0092084 A1* | 4/2007 | Chun | H04S 7/30 381/1 |
| 2009/0116652 A1 | 5/2009 | Kirkeby | |
| 2009/0208022 A1 | 8/2009 | Fukui | |
| 2009/0214045 A1 | 8/2009 | Fukui | |
| 2010/0273505 A1 | 10/2010 | Moller | |
| 2011/0216906 A1 | 9/2011 | Swaminathan | |
| 2012/0014527 A1* | 1/2012 | Furse | H04S 3/00 381/17 |
| 2012/0051568 A1 | 3/2012 | Kim | |
| 2012/0213375 A1 | 8/2012 | Mahabub | |
| 2012/0262536 A1 | 10/2012 | Chen | |

OTHER PUBLICATIONS http://en.wikipedia.org/wiki/Moore-Penrose_pseudoinverse, last edited Jun. 27, 2018.

http://www.sengpielaudio.com/calculator-squarelaw.htm; Sep. 10, 2015.

Jean-Marc Jot, et al."Binaural Simulation of Complex Acoustic Scenes for Interactive Audio" 15th International Conference: Audio, Acoustics & Small Spaces, Audio Engineering Society, vol. 121, Jan. 1, 2006, pp. 1-20.

Kim, Y. et al."An Integrated Approach of 3D Sound Rendering Techniques for Sound Externalization" Sep. 2010, Lecture Notes in Computer Science.

Pulkki Ville, et al "Efficient Spatial Sound Synthesis for Virtual Worlds" Conference: 35th International Conference: Audio for Games, Feb. 2009.

* cited by examiner

METHOD OF RENDERING ONE OR MORE CAPTURED AUDIO SOUNDFIELDS TO A LISTENER

CROSS-REFERENCE TO RELATED APPLICATIONS

This application is a continuation application of U.S. patent application Ser. No. 17/397,887 filed on Aug. 9, 2021, which is a continuation patent application Ser. No. 16/908,568 filed on Jun. 22, 2020 (now U.S. Pat. No. 11,089,421), which is a continuation application of U.S. patent application Ser. No. 16/518,666 filed on Jul. 22, 2019 (now U.S. Pat. No. 10,694,305), which is a continuation application of U.S. patent application Ser. No. 16/009,154 filed on Jun. 14, 2018 (now U.S. Pat. No. 10,362,420), which is a continuation application of U.S. patent application Ser. No. 15/480,163 filed on Apr. 5, 2017 (now U.S. Pat. No. 10,003,900), which is a continuation application of U.S. patent application Ser. No. 14/774,943 filed on Sep. 11, 2015 (now U.S. Pat. No. 9,648,439), which is the U.S. national stage of International Application No. PCT/US2014/023275 filed Mar. 11, 2014, which claims the benefit of priority from U.S. Provisional Patent Application No. 61/777,151 filed Mar. 12, 2013, U.S. Provisional Patent Application No. 61/843,176 filed Jul. 5, 2013, U.S. Provisional Patent Application No. 61/879,776 filed Sep. 19, 2013, all incorporated herein by reference.

TECHNICAL FIELD

This invention relates to a method of rendering one or more captured audio soundfields to a listener.

SUMMARY

In one aspect of the present disclosure, there is provided a method of rendering one or more captured audio soundfields to a listener, the one or more captured audio soundfields comprising audio from one or more audio sources, the method comprising:

delivering the one or more captured audio soundfields to the listener with a first audio element perceived by the listener as emanating from a first virtual source location and with a second audio element perceived by the listener as emanating from a second virtual source location, The first virtual source location and the second virtual source location being perceived by the listener as being located to the front of the listener.

By arranging the first audio element to be perceived by the listener as emanating from a first virtual source location and the second audio element to be perceived by the listener as emanating from a second virtual source location, this arrangement results in a more natural listening experience for the listener and enables the listener to clearly distinguish between the audio from the first audio source and the audio from the second audio source.

By arranging the first virtual source location and the second virtual source location to be perceived by the listener as being located to the front of the listener, this arrangement results in a more natural listening experience for the listener and enables the listener to clearly distinguish between the audio from the first audio source and the audio from the second audio source. Thus, embodiments disclosed herein may enable a high degree of spatial diversity to be perceived by the listener, such that no sound source is perceived as emanating directly from the sides. Maximal spatial diversity is maintained to enable the listener to perceptually separate a talker in a soundfield from other talkers and noise sources in the same soundfield and from reverberation of that same talker. The listener does not hear anybody talking from the sides, which is deemed to be annoying by many listeners if it occurs for extended periods of time. When multiple soundfield endpoints are simultaneously active, the listener is able to determine at which endpoint each talker is located by means of the virtual rendering location.

In one embodiment, a first virtual axis extends from the head of the listener to the first virtual source location, a front virtual axis extends from the head of the listener straight ahead to the front of the listener, a first angle is subtended between the first virtual axis and the front virtual axis, and the component of the first angle resolved to a horizontal plane is in the range of from 0 degrees to 60 degrees. Preferably the front virtual axis extends substantially perpendicular to the face of the listener. Ideally the horizontal plane is substantially perpendicular to the face of the listener. Most preferably a side virtual axis extends from the right ear of the listener to the left ear of the listener, and the front virtual axis extends substantially perpendicular to the side virtual axis. The front virtual axis and the side virtual axis may lie in the horizontal plane. Preferably the component of the first angle resolved to the horizontal plane is in the range of from 0 degrees to 45 degrees. Most preferably the component of the first angle resolved to the horizontal plane is in the range of from 0 degrees to 30 degrees.

In another embodiment the component of the first angle resolved to a first vertical plane is in the range of from 0 degrees to 90 degrees. Preferably the first vertical plane is substantially perpendicular to the face of the listener. Ideally a top virtual axis extends from the head of the listener straight away from the top of the head of the listener, and the top virtual axis extends substantially perpendicular to the top of the head of the listener. Most preferably the top virtual axis extends substantially perpendicular to the side virtual axis. The front virtual axis and the top virtual axis may lie in the first vertical plane. Preferably the component of the first angle resolved to the first vertical plane is in the range of from 0 degrees to 60 degrees. Ideally the component of the first angle resolved to the first vertical plane is in the range of from 0 degrees to 45 degrees. Most preferably the component of the first angle resolved to the first vertical plane is in the range of from 0 degrees to 30 degrees.

In one embodiment the vertical location of the first virtual source location differs from the vertical location of the second virtual source location. By arranging the virtual source locations to be at different vertical heights, this arrangement results in a more natural listening experience for the listener and enables the listener to clearly distinguish between the audio from the first audio source and the audio from the second audio source. Preferably a second virtual axis extends from the head of the listener to the second virtual source location, a difference angle is subtended between the first virtual axis and the second virtual axis, and the component of the difference angle resolved to the first vertical plane is greater than 0 degrees. Ideally the component of the difference angle resolved to the first vertical plane is greater than 10 degrees. Most preferably the component of the difference angle resolved to the first vertical plane is greater than 20 degrees.

In one case the one or more captured audio soundfields is delivered to the listener with a plurality of audio elements perceived by the listener as emanating from a plurality of virtual source locations. Preferably each audio element is perceived by the listener as emanating from a different virtual source location. By arranging the audio from each audio source to be perceived by the listener as emanating from a different virtual source location, this arrangement results in a more natural listening experience for the listener and enables the listener to clearly distinguish between the audio from each audio source. Thus, embodiments disclosed herein may enable multiple soundfields to be spatially multiplexed, that are simultaneously presented to the listener such that each soundfield appears to come from a separate region of virtual space.

Each of the virtual source locations may lie in a second vertical plane. By arranging the virtual source locations to lie in the second vertical plane, this arrangement results in a more natural listening experience for the listener and enables the listener to clearly distinguish between the audio from each audio source. In another case each of the virtual source locations is represented as a point on a single virtual curve. Preferably the virtual curve is located in the second vertical plane. Ideally the second vertical plane is substantially perpendicular to the first vertical plane. Most preferably the second vertical plane is substantially perpendicular to the horizontal plane. The second vertical plane may be substantially parallel to the face of the listener. Preferably the virtual curve is a closed curve. Ideally the center of the closed curve lies substantially on the front virtual axis. The closed curve may be a circle. The closed curve may be an ellipse. The closed path may be an ellipsoid in a vertical plane with its center lying on the horizontal plane.

In one embodiment the one or more captured audio soundfields is delivered to the listener with at least part of the first audio element delivered to the listener from a third virtual source location, the third virtual source location being located to the rear of the listener or located to the side of the listener. By arranging the first audio element delivered to the listener from the third virtual source location located to the rear of the listener or located to the side of the listener, this arrangement results in a more natural listening experience for the listener and enables the listener to clearly distinguish between the audio from each audio source. Thus, embodiments disclosed herein may add the rear/side energy through parts of a plurality of delayed copies of the original soundfield. In one case the delivery of the least part of the first audio element delivered to the listener from the third virtual source location in combination with the delivery of the first audio element to the listener from the first virtual source location and the second audio element to the listener from the second virtual source location renders the least part of the first audio element delivered to the listener from the third virtual source location non-perceivable by the listener as emanating from the third virtual source location. Preferably the least part of the first audio element delivered to the listener from the third virtual source location is perceivable by the listener as emanating from the third virtual source location, in the event of isolation of the delivery of the least part of the first audio element delivered to the listener from the third virtual source location from the delivery of the first audio element to the listener from the first virtual source location and the second audio element to the listener from the second virtual source location. Preferably at least part of the first audio element delivered to the listener from the third virtual source location is a time delayed version of the first audio element perceived by the listener as emanating from the first virtual source location. By time delaying the first audio element delivered to the listener from the third virtual source location, this arrangement creates a natural room echo effect for the listener. Ideally the time delay is in the range of from 5 to 30 milliseconds. The rear/side reflections may be delayed by 5 to 30 milliseconds. The gain of the at least part of the first audio element delivered to the listener from the third virtual source location may differ from the gain of the first audio element perceived by the listener as emanating from the first virtual source location. By varying the gain of the first audio element delivered to the listener from the third virtual source location, this arrangement creates a natural room echo effect for the listener. Most preferably the gain of the at least part of the first audio element delivered to the listener from the third virtual source location is inversely proportional to the distance from the third virtual source location to the listener. The rear/side reflections may lie on K/r gain profile.

In another embodiment a third virtual axis extends from the head of the listener to the third virtual source location, a rear virtual axis extends from the head of the listener straight behind to the rear of the listener, a third angle is subtended between the third virtual axis and the rear virtual axis, and the component of the third angle resolved to the horizontal plane is in the range of from 0 degrees to 120 degrees. Preferably the rear virtual axis extends substantially perpendicular to the face of the listener. Ideally the rear virtual axis extends substantially perpendicular to the side virtual axis. Most preferably the rear virtual axis and the side virtual axis lie in the horizontal plane. The component of the third angle resolved to the horizontal plane may be in the range of from 0 degrees to 90 degrees. The component of the third angle resolved to the horizontal plane may be in the range of from 0 degrees to 60 degrees. Preferably the component of the third angle resolved to the horizontal plane is in the range of from 0 degrees to 45 degrees. Ideally the component of the third angle resolved to the horizontal plane is in the range of from 0 degrees to 30 degrees.

In one case the component of the third angle resolved to the first vertical plane is in the range of from 0 degrees to 90 degrees. Preferably the rear virtual axis and the top virtual axis lie in the first vertical plane. Ideally the component of the third angle resolved to the first vertical plane is in the range of from 0 degrees to 60 degrees. Most preferably the component of the third angle resolved to the first vertical plane is in the range of from 0 degrees to 45 degrees. The component of the third angle resolved to the first vertical plane may be in the range of from 0 degrees to 30 degrees. Preferably the component of the third angle resolved to the first vertical plane is approximately 0 degrees. Ideally the third virtual source location and the rear virtual axis lie in the same plane. The source positions from the rear/side hemisphere may lie on the rear/side horizontal half-plane.

In another case the method comprises the step of capturing the one or more audio soundfields. Preferably each audio soundfield is captured by one or more soundfield microphones. Ideally the audio from the audio source comprises speech from one or more persons. Most preferably the audio source comprises one or more participants in a conference meeting. Various embodiments disclosed herein are suitable for use in teleconferencing applications. For example, the audio from the first audio source may be speech from a first person, and the audio from the second audio source may be speech from a second person, with both the first person and the second person located in the same physical conference room. In another example the audio from the first audio source may be speech from a first group of people in a first physical conference room, and the audio from the second audio source may be speech from second group of people in a second physical conference room, with the two physical conference rooms located remote from one another.

In one embodiment the method comprises the step of transmitting the one or more captured audio soundfields to the listener. The transmission may be implemented in any suitable manner, for example telephony transmission. Preferably the one or more audio soundfields is captured at one or more real capture locations, and the listener is located at a real listener location remote from the one or more real capture locations.

Another embodiment provides a method of binaural rendering one or more captured audio soundfields to a listener.

In one case the one or more captured audio soundfields is delivered to the listener using one or more head related transfer functions (HRTF). Preferably the one or more captured audio soundfields is delivered to the listener using a plurality of head related transfer functions (HRTF), with one head related transfer function for each virtual source location. Various embodiments may be implemented by decoding the soundfield as if for a horizontal N-speaker array and rendering through N discrete HRTFs corresponding to source positions sampled on a closed path in front of the listener. The rear/side reflections may be rendered through M discrete HRTFs corresponding to source positions sampled from the rear/side hemisphere. The soundfield decode for the rear/side reflections may be formed by M dipole patterns equally spaced in azimuth. M may be equal to 3 for a first order horizontal Ambisonic soundfield. Ideally the one or more captured audio soundfields is delivered to the listener via a set of headphones. The headphone virtualization technique for isotropic soundfields virtually places the entire soundfield in front of the listener. Various embodiments enable virtual head related transfer function (HRTF) based binaural rendering of soundfields over headphones. The soundfields may be represented in BFormat/Ambisonic-style isotropic decomposition formats.

The present disclosure also provides, in another aspect, a system for rendering one or more captured audio soundfields to a listener, the one or more captured audio soundfields comprising audio from one or more audio sources, the system comprising:
  apparatus for delivering the one or more captured audio soundfields to a listener with a first audio element perceived by the listener as emanating from a first virtual source location and with a second audio element perceived by the listener as emanating from a second virtual source location,
  the first virtual source location and the second virtual source location being perceived by the listener as being located to the front of the listener.

By arranging the first audio element to be perceived by the listener as emanating from a first virtual source location and the second audio element to be perceived by the listener as emanating from a second virtual source location, this arrangement results in a more natural listening experience for the listener and enables the listener to clearly distinguish between the audio from the first audio source and the audio from the second audio source.

By arranging the first virtual source location and the second virtual source location to be perceived by the listener as being located to the front of the listener, this arrangement results in a more natural listening experience for the listener and enables the listener to clearly distinguish between the audio from the first audio source and the audio from the second audio source.

In various embodiments, the system comprises apparatus to capture one or more audio soundfields. Preferably the apparatus to capture one or more audio soundfields comprises one or more soundfield microphones. Ideally the system comprises apparatus to transmit one or more captured audio soundfields to a listener. The transmission may be implemented in any suitable manner, for example telephony transmission. Most preferably the apparatus for delivering the one or more captured audio soundfields to a listener comprises a set of headphones.

In another aspect, the present disclosure provides a computer implemented system.

In another aspect, the present disclosure provides a method of adapting a received soundfield audio signal, the received soundfield audio signal comprising an audio object and direction information pertaining to the audio object, the direction information indicating a perceived direction of arrival for playback of the audio object with respect to a reference human-listener pose (i.e., a reference position and orientation of a human listener's head relative to whatever equipment is used to effect the playback, e.g. suitable headphones). The method may comprise determining from the direction information that the perceived direction of arrival is a from-behind direction with respect to the reference human-listener pose. The method may further comprise adapting the direction data to thereby change the direction of arrival into a from-in-front direction with respect to the reference human-listener pose.

The received soundfield audio signal may comprise at least one further audio object, in which case the direction information pertains to the audio object and to the further audio object(s), the direction information indicating respective perceived directions of arrival for playback of the audio object and the further audio object(s) with respect to the reference human-listener pose. Thus, in various embodiments, the method may comprise adapting the direction data to thereby arrange the respective directions of arrival for the audio object and the further audio object(s) into a predetermined arrangement relative to the reference human-listener pose, e.g. into plural, equally-spaced, from-in-front directions with respect to the reference human-listener pose.

There is also provided a computer program product comprising computer program code capable of causing a computer system to perform the above method when the computer program product is run on a computer system. The computer program product may be embodied on a record medium, or a carrier signal, or a read-only memory.

BRIEF DESCRIPTION OF THE DRAWINGS

The invention will be more clearly understood from the following description of some embodiments thereof, given by way of example only, with reference to the accompanying drawings, in which.

DETAILED DESCRIPTION OF THE INVENTION

Figure 1:
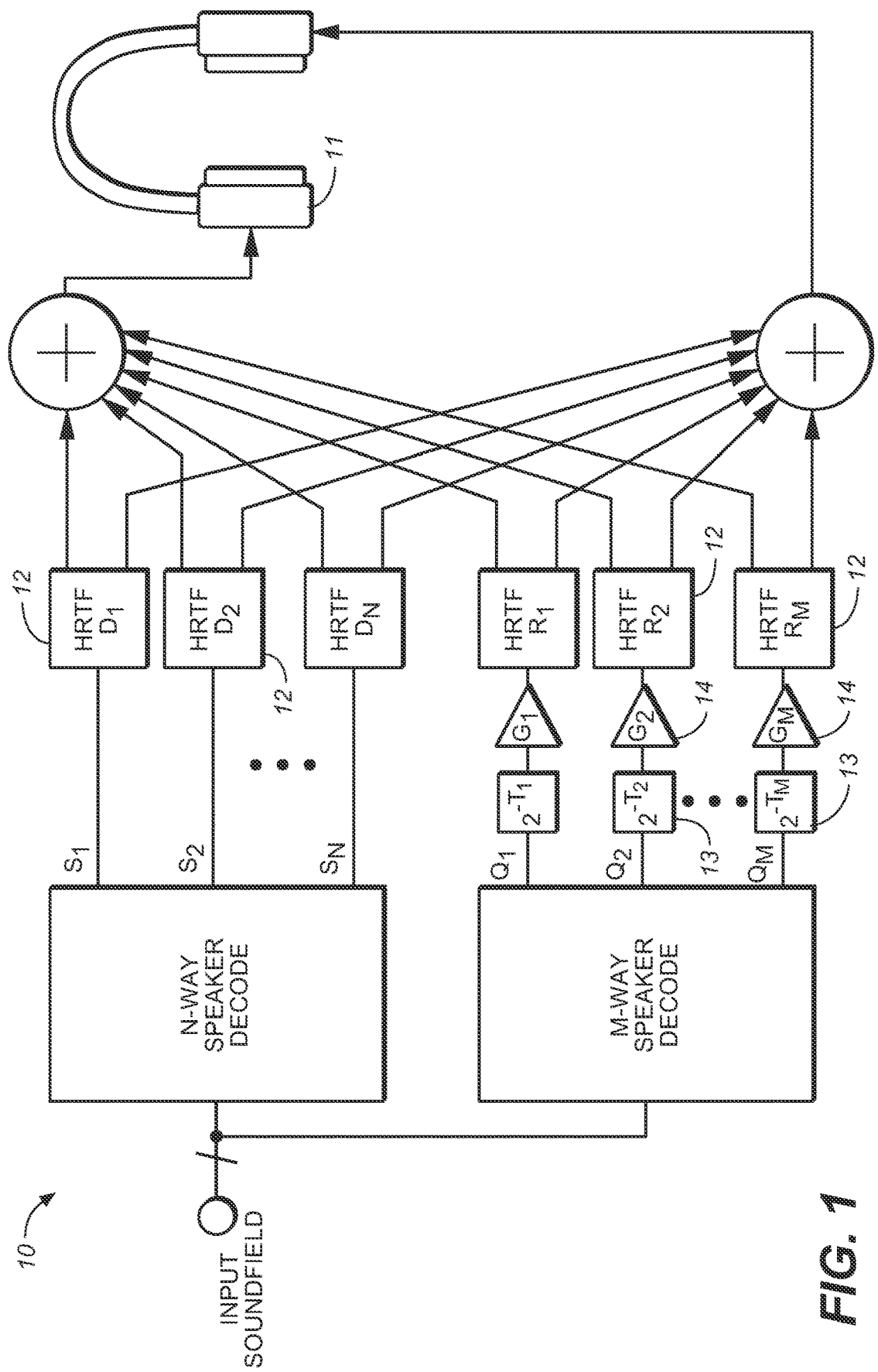
FIG. 1 is a schematic illustration of a system for rendering one or more captured audio soundfields to a listener according to the invention.

Referring to the drawings, and initially to FIGS. 1 to 8 thereof, there is illustrated a computer implemented system for rendering one or more captured audio soundfields to a listener 4 according to the invention. The captured audio soundfields comprise audio from a plurality of audio sources. The audio from each audio source may comprise speech from one person or from more than one person, for example a group of people attending a meeting in a room. The audio source may comprise one participant or more than one participant in a conference meeting. The system may be applied in soundfield teleconferencing where a plurality of soundfields captured by teleconferencing devices equipped with soundfield microphones are to be presented to a remote listener wearing headphones.

The system comprises apparatus to capture the audio soundfields, apparatus to transmit the captured audio soundfields to the listener 4, and apparatus 10 to deliver the captured audio soundfields to the listener 4.

The capturing apparatus may be provided in any suitable form, for example the capturing apparatus may comprise one or more soundfield microphones. One soundfield microphone or a plurality of soundfield microphones may be provided to capture the audio in each conference meeting room.

Soundfield refers to the capture of an approximation of the full field of sound incident at a particular point in space including directional information. A soundfield microphone is one which captures more than one channel of spatial diversity and therefore allows playback to the listener of some approximation of the original soundfield including some directional information. A soundfield microphone differs from an omnidirectional microphone which captures sound from all directions equally, and a directional microphone, such as cardioid, which captures sound from some directions while rejecting sound from others. Such single element microphones capture only a single channel of information and retain no spatial information that would be useful for giving a listener a sense of the original spatial location of the sound sources.

Soundfields may be stored and transmitted using a discrete multichannel format, such as Dolby Digital Plus, which is intended for playback on a particular speaker array, for example left front, centre, right front, left surround, and right surround. Alternatively, soundfields may be stored and transmitted using an isotropic spatial decomposition technique which allows playback over any speaker array. The B-Format/Ambisonics family of formats and technology is an example of this technique. This family may be used in horizontal-only as well as periphonic configurations. The following description relates to horizontal-only first-order soundfields. However, the invention is also applicable to extensions to periphony.

A horizontal-only first order B-Format soundfield is defined by the three signals W, X and Y. W represents the signal that would have been captured by an omnidirectional microphone. X represents the signal that would have been captured by a figure-of-eight dipole microphone with positive lobe pointing along the positive X axis. Y represents the signal that would have been captured by a figure-of-eight dipole microphone with positive lobe pointing along the positive Y axis, where X and Y are assumed to be orthogonal and the three virtual microphone patterns coincident in space.

Soundfield reproduction reproduces at the listener's ears the best possible approximation to what would have been heard by the listener if he or she was present at the recording location.

Typically, the audio soundfields are captured at one or more real capture locations, for example one or more conference meeting rooms, and the listener 4 is located at a real listener location remote from the one or more real capture locations. The captured audio soundfields may be transmitted from the one or more conference meeting rooms to the listener 4 at the remote location in any suitable manner, for example telephony transmission.

The system is configured for binaural rendering the captured audio soundfields to the listener 4. The delivery apparatus 10 comprises a set of headphones 11 to deliver the captured audio soundfields to the listener 4. The system of the invention enables full frontal headphone virtualisation.

Figure 2:
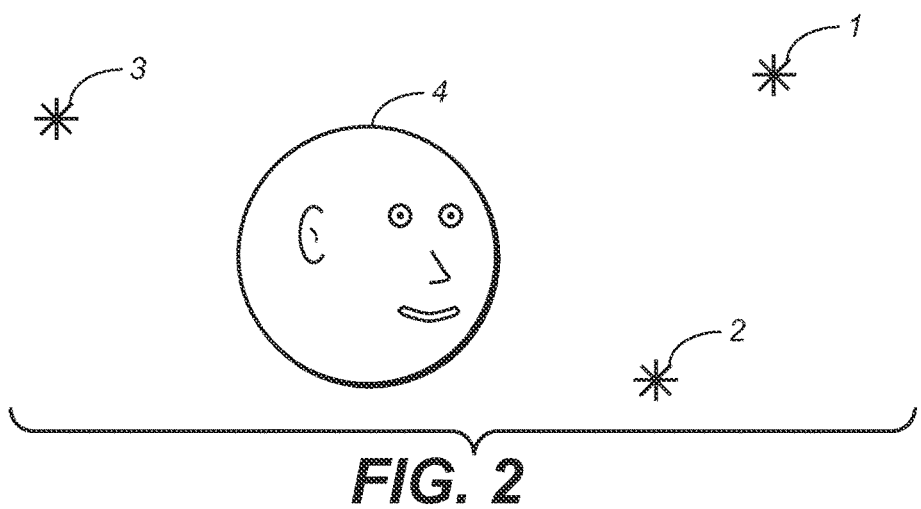
FIG. 2 is an isometric view of a listener and three virtual source locations.

The delivery apparatus 10 employs a plurality of head related transfer functions (HRTF) 12 to deliver the captured audio soundfields to the listener 4 in the desired configuration. The delivery apparatus 10 is configured to deliver the captured audio soundfields to the listener 4 with a plurality of audio elements perceived by the listener 4 as emanating from a plurality of different virtual source locations. In particular the delivery apparatus 10 is configured to deliver the captured audio soundfields to the listener 4 with a first audio element perceived by the listener 4 as emanating from a first virtual source location 1, with a second audio element perceived by the listener 4 as emanating from a second virtual source location 2, and with at least part of the first audio element and/or the second audio element delivered to the listener 4 from a third virtual source location 3. The first virtual source location 1 and the second virtual source location 2 are perceived by the listener 4 as being located to the front of the listener 4, and the third virtual source location 3 is located to the rear of the listener 4 or located to the side of the listener 4, as illustrated in FIG. 2. One head related transfer function 12 is provided for each virtual source location 1, 2, 3.

When the audio from the first/second audio element is delivered to the listener 4 from the third virtual source location 3 in combination with the delivery of the first audio element to the listener 4 from the first virtual source location 1 and the second audio element to the listener 4 from the second virtual source location 2, this arrangement renders the first/second audio element delivered to the listener 4 from the third virtual source location 3 as not being separably perceivable by the listener 4 as emanating from the third virtual source location 3. If the delivery of the first/second audio element delivered to the listener 4 from the third virtual source location 3 could be isolated from the delivery of the first audio element to the listener 4 from the first virtual source location 1 and the second audio element to the listener 4 from the second virtual source location 2, then in these circumstances the first/second audio element delivered to the listener 4 from the third virtual source location 3 would be perceivable by the listener 4 as emanating from the third virtual source location 3.

Figure 3:
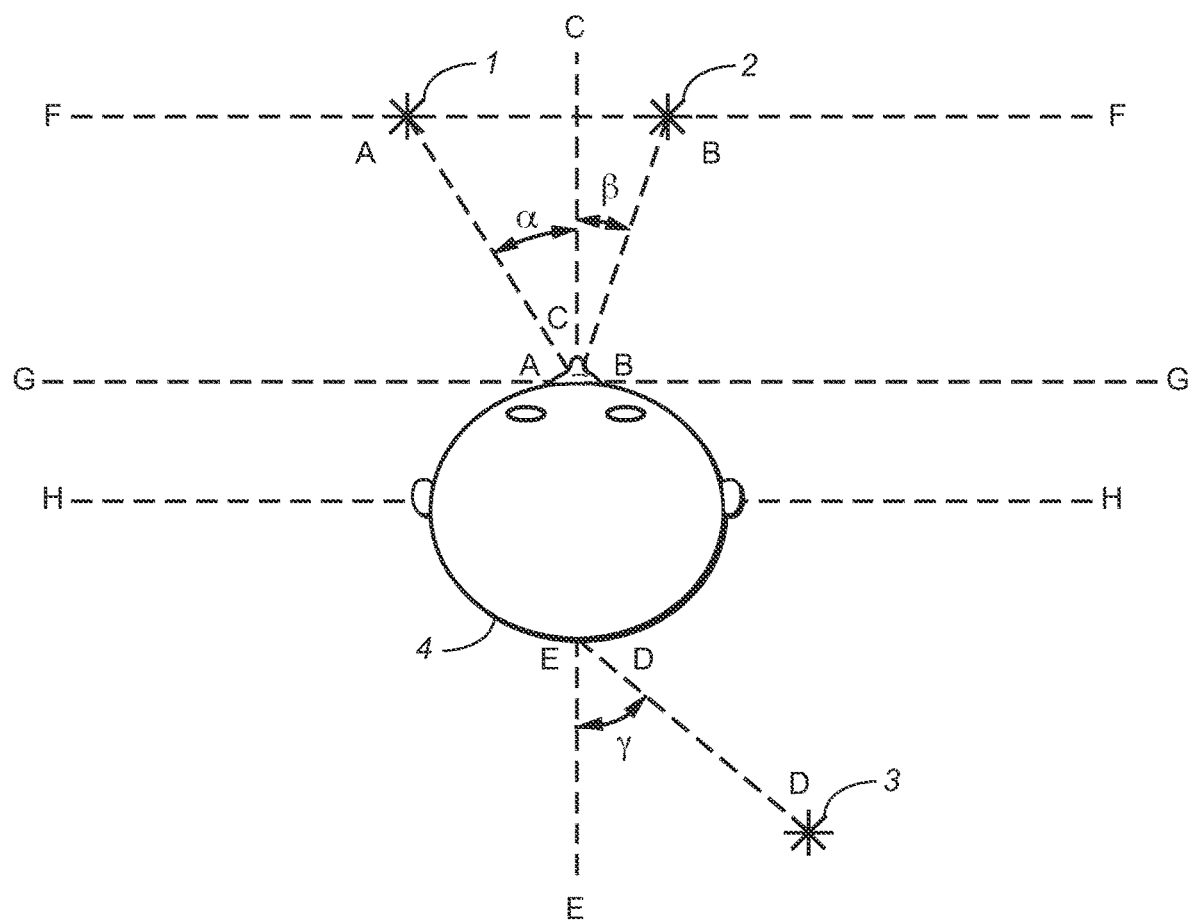
FIG. 3 is a plan view of the listener and the three virtual source locations of FIG. 2.
Figure 4:
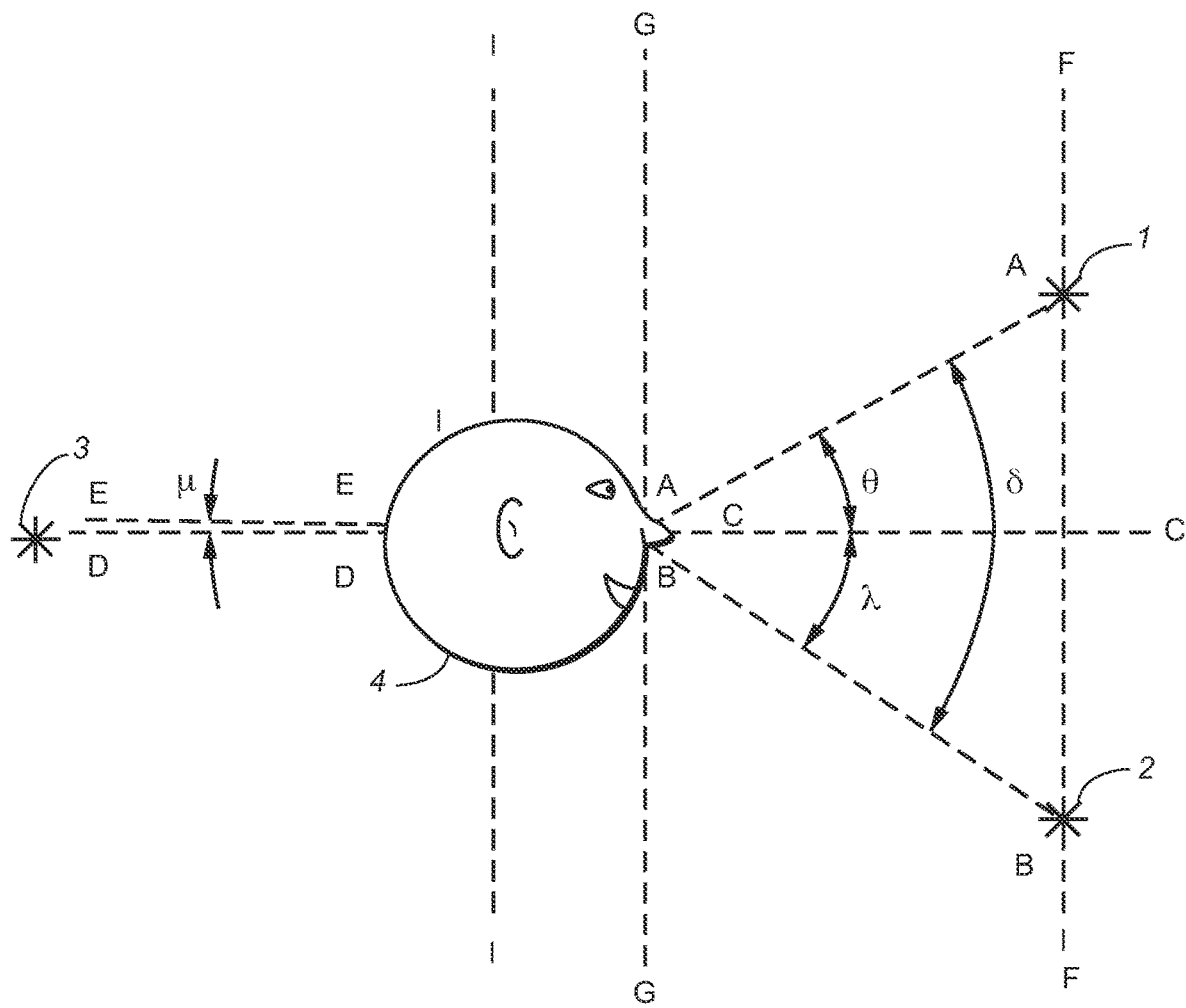
FIG. 4 is a side view of the listener and the three virtual source locations of FIG. 2.

As illustrated in FIGS. 3 and 4, a front virtual axis C-C extends from the head of the listener 4 straight ahead to the front of the listener 4, a side virtual axis H-H extends from the right ear of the listener 4 to the left ear of the listener 4, a top virtual axis I-I extends from the head of the listener 4 straight away from the top of the head of the listener 4, a rear virtual axis E-E extends from the centre of the rear of the head of the listener 4 straight behind to the rear of the listener 4. The front virtual axis C-C extends substantially perpendicular to the plane G-G of the face of the listener 4. The front virtual axis C-C extends substantially perpendicular to the side virtual axis H-H. The top virtual axis I-I extends substantially perpendicular to the top of the head of the listener 4. The top virtual axis I-I extends substantially perpendicular to the side virtual axis H-H. The rear virtual axis E-E extends substantially perpendicular to the plane G-G of the face of the listener 4. The rear virtual axis E-E extends substantially perpendicular to the side virtual axis H-H. The rear virtual axis E-E is co-linear with the front virtual axis C-C.

A first virtual axis A-A extends from the nose of the head of the listener 4 to the first virtual source location 1. A second virtual axis B-B extends from the nose of the head of the listener 4 to the second virtual source location 2. A third virtual axis D-D extends from the centre of the rear of the head of the listener 4 to the third virtual source location 3.

A first angle is subtended between the first virtual axis A-A and the front virtual axis C-C. As illustrated in FIG. 3, the component a of the first angle resolved to the horizontal plane may be in the range of from 0 degrees to 60 degrees, preferably is in the range of from 0 degrees to 45 degrees, and in this case is in the range of from 0 degrees to 30 degrees.

The horizontal plane is substantially perpendicular to the plane G-G of the face of the listener 4. The front virtual axis C-C and the side virtual axis H-H lie in the horizontal plane.

The term horizontal plane does not relate to the global surroundings of the listener 4. Rather the horizontal plane relates to the plane extending through the centre of the head of the listener 4 made up by an x-axis represented by the front virtual axis C-C and a y-axis represented by the side virtual axis H-H.

A second angle is subtended between the second virtual axis B-B and the front virtual axis C-C. Similarly the component β of the second angle resolved to the horizontal plane may be in the range of from 0 degrees to 90 degrees, preferably is in the range of from 0 degrees to 60 degrees, ideally is in the range of from 0 degrees to 45 degrees, and in this case is in the range of from 0 degrees to 30 degrees.

As illustrated in FIG. 4, the component θ of the first angle resolved to a first vertical plane may be in the range of from 0 degrees to 60 degrees, preferably is in the range of from 0 degrees to 45 degrees, and in this case is in the range of from 0 degrees to 30 degrees.

The first vertical plane is substantially perpendicular to the plane G-G of the face of the listener 4. The front virtual axis C-C and the top virtual axis I-I lie in the first vertical plane.

The term first vertical plane does not relate to the global surroundings of the listener 4. Rather the first vertical plane relates to the plane extending through the centre of the head of the listener 4 made up by an x-axis represented by the front virtual axis C-C and a z-axis represented by the top virtual axis I-I.

Similarly the component λ of the second angle resolved to the first vertical plane may be in the range of from 0 degrees to 90 degrees, preferably is in the range of from 0 degrees to 60 degrees, ideally is in the range of from 0 degrees to 45 degrees, and in this case is in the range of from 0 degrees to 30 degrees.

As illustrated in FIG. 4, the first virtual source location 1 and the second virtual source location 2 do not lie in the same horizontal plane, rather the vertical location of the first virtual source location 1 differs from the vertical location of the second virtual source location 2. A difference angle is subtended between the first virtual axis A-A and the second virtual axis B-B. As illustrated in FIG. 4, the component δ of the difference angle resolved to the first vertical plane is greater than 0 degrees, preferably is greater than 10 degrees, and in this case is greater than 20 degrees.

Both the first virtual source location 1 and the second virtual source location 2 lie in a second vertical plane F-F. The second vertical plane F-F is substantially perpendicular to the first vertical plane. The second vertical plane F-F is substantially perpendicular to the horizontal plane. The second vertical plane F-F is substantially parallel to the plane G-G of the face of the listener 4.

A third angle is subtended between the third virtual axis D-D and the rear virtual axis E-E. As illustrated in FIG. 3, the component γ of the third angle resolved to the horizontal plane may be in the range of from 0 degrees to 120 degrees, may be in the range of from 0 degrees to 90 degrees, preferably is in the range of from 0 degrees to 60 degrees, ideally is in the range of from 0 degrees to 45 degrees, and in this case is in the range of from 0 degrees to 30 degrees.

The rear virtual axis E-E and the side virtual axis H-H lie in the horizontal plane.

As illustrated in FIG. 4, the component μ of the third angle resolved to the first vertical plane may be in the range of from 0 degrees to 90 degrees, preferably is in the range of from 0 degrees to 60 degrees, ideally is in the range of from 0 degrees to 45 degrees, and in this case is in the range of from 0 degrees to 30 degrees. The component μ of the third angle resolved to the first vertical plane may be approximately 0 degrees such that the third virtual source location 3 and the rear virtual axis E-E both lie in the horizontal plane.

The rear virtual axis E-E and the top virtual axis I-I lie in the first vertical plane.

In further detail the methods of performing speaker decode may comprise the pseudoinverse method. In this method the record matrix R is built by calculating how plane wave $M_1, M_2, \ldots M_N$ in an anechoic environment incident at each angle $\phi_1, \phi_2, \ldots \phi_N$. For first-order B-Format a plane wave source M incident at the microphone array at angle φ will produce the following W, X, Y signals at the microphone output.

$$\begin{bmatrix} W \\ X \\ Y \end{bmatrix} = \begin{bmatrix} 1 \\ \cos\phi \\ \sin\phi \end{bmatrix} M$$

Therefore, the record matrix R will be as follows.

$$R = \begin{bmatrix} 1 & 1 & \ldots & 1 \\ \cos\phi_1 & \cos\phi_2 & \ldots & \cos\phi_N \\ \sin\phi_1 & \sin\phi_2 & \ldots & \sin\phi_N \end{bmatrix}$$

By definition, R may be used to calculate the soundfield W, X, Y that would result from plane wave signals $M_1, M_2, \ldots M_N$ incident at angles $\phi_1, \phi_2, \ldots \phi_N$;

$$\begin{bmatrix} W \\ X \\ Y \end{bmatrix} = R \begin{bmatrix} M_1 \\ M_2 \\ \vdots \\ M_N \end{bmatrix}$$

To decode a soundfield to N virtual speakers, the playback matrix P is calculated as the pseudo-inverse, for example using the Moore-Penrose pseudoinverse, calculated using the MATLAB pinv function, of R:

$$P = R^+$$

Further details on the Moore-Penrose pseudoinverse may be found at http://en.wikipedia.org/wiki/Moore—Penrose_pseudoinverse.

The playback matrix P describes how to generate speaker feeds $S_1$, $S_2$, ... $S_N$ for speakers at azimuth angles $\phi_1$, $\phi_2$, ... $\phi_N$ from an input W, X, Y soundfield as follows.

$$\begin{bmatrix} S_1 \\ S_2 \\ \vdots \\ S_N \end{bmatrix} = P \begin{bmatrix} W \\ X \\ Y \end{bmatrix}$$

Figure 10:
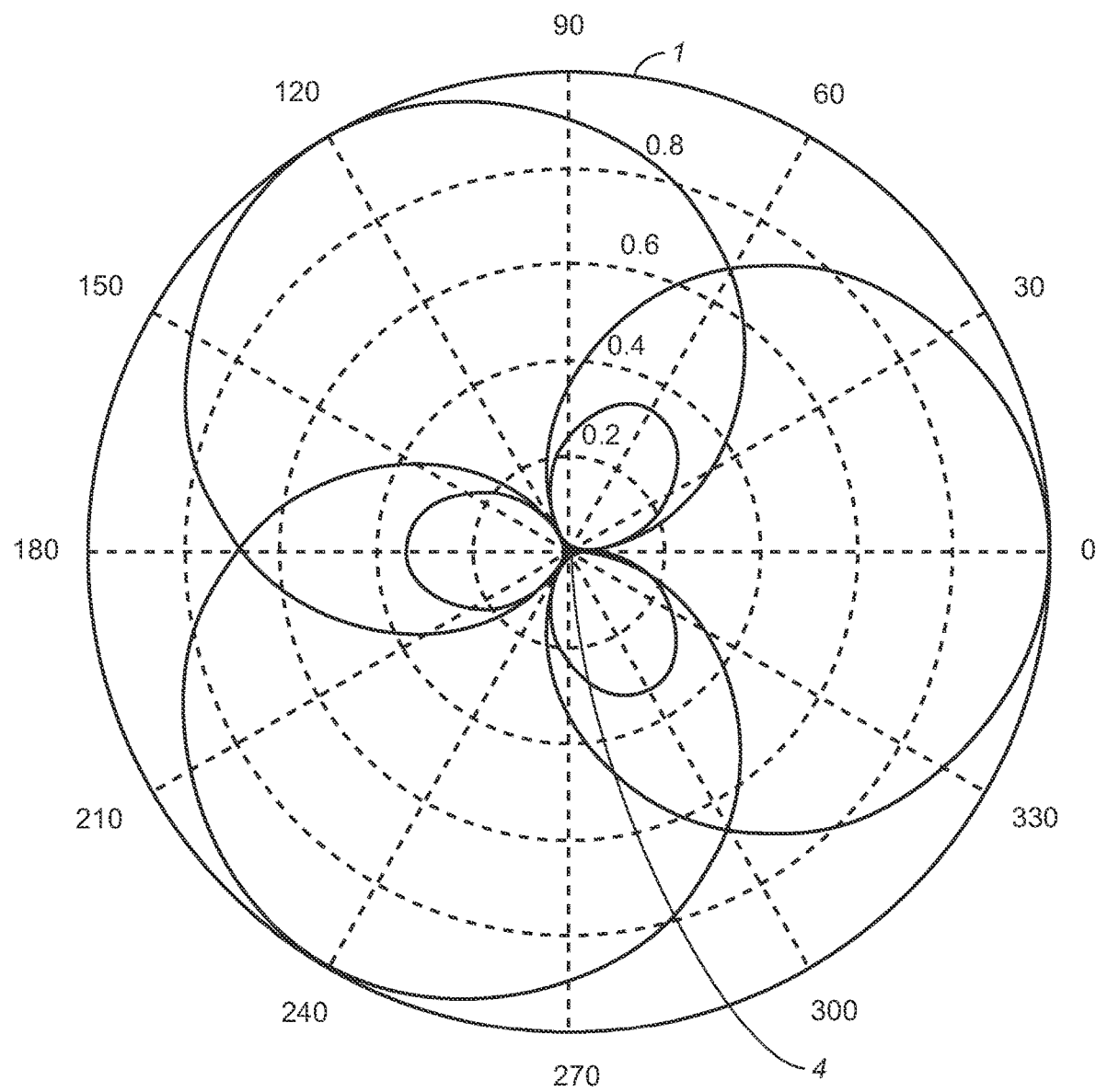
FIG. 10 is a plan view of a listener and virtual dipole microphone signals.

A polar directionality plot may be performed which shows how a plane wave in the soundfield contributes to each of the speaker feeds. FIG. 10 shows such a plot for N=3 and $\phi_1$=0°, $\phi_2$=120°, $\phi_N$=240°. It is generated by plotting the absolute value of the quantity r(θ) for angles 0°≤θ<360°:

$$r(\theta) = P \begin{bmatrix} 1 \\ \cos\theta \\ \sin\theta \end{bmatrix}$$

FIG. 10 illustrates a typical playback matrix directionality for N=3.

When the N-way speaker decode has been performed, each of them may be fed through a left and right ear HRTF and the results summed to achieve virtual headphone rendering of the soundfield. HRTF filtering may typically be achieved using FIR filters of approximately 80 taps in length when the sampling frequency is 48000 samples per second.

It will be appreciated that since both the playback matrix P, the HRTFs and the summing junctions at the end are linear and time-invariant, these operations may be combined to achieve efficient implementation in a digital signal processor. For example, the playback matrix may be combined with the FIR filtering to produce a 3-in, 2-out matrix of FIR filters that directly map WXY to LR. It may be advantageous to perform the filtering into shuffled domain, also known as sum/difference or mid/side mode, in order to exploit left/right symmetry of the HRTFs.

The incoming soundfield have been decoded to N virtual speaker feeds $S_1$, $S_2$, ..., SN designed for speakers placed at in azimuth angles $\phi_1$, $\phi_2$, ... $\phi_N$ relative to the listener 4 at the centre of a virtual speaker array. Instead of sending those to N physical speakers, they were processed with HRTFs measured from point sources at angles $\phi_1$, $\phi_2$, ... $\phi_N$.

The part of the first/second audio element delivered to the listener 4 from the third virtual source location 3 is a time delayed version of the first/second audio element perceived by the listener as emanating from the first/second virtual source location 1, 2. The delivery apparatus 10 comprises a plurality of time delay blocks 13 to time delay the part of the audio from the first/second audio source which is to be perceived by the listener 4 as emanating from the third virtual source location 3. The time delay may be in the range of from 5 to 30 milliseconds. The invention includes filling out the rear/side of the perceived virtual scene by applying a plurality of time delays to the soundfield and presenting parts of said delayed copies in the virtual scene from locations including rear/side locations.

The gain of the part of the first/second audio element delivered to the listener from the third virtual source location 3 differs from the gain of the first/second audio element perceived by the listener as emanating from the first/second virtual source location 1, 2. The delivery apparatus 10 comprises a plurality of gain blocks 14 to vary the gain of the part of the audio from the first/second audio source. The gain of the part of the first/second audio element delivered to the listener 4 from the third virtual source location 3 is controlled to be inversely proportional to the distance between the third virtual source location 3 and the listener 4.

In use, the soundfield microphones capture the audio in each conference meeting room. The captured audio soundfields are transmitted from the conference meeting rooms to the listener 4 at the remote location.

The delivery apparatus 10 employs the plurality of head related transfer functions (HRTF) 12 to deliver the captured audio soundfields to the listener 4 in the desired configuration. In particular the delivery apparatus 10 delivers the captured audio soundfields to the listener 4 with the first audio element perceived by the listener 4 as emanating from the first virtual source location 1, with the second audio element perceived by the listener 4 as emanating from the second virtual source location 2, and with part of the first audio element and/or second audio element delivered to the listener 4 from the third virtual source location 3.

The time delay blocks 13 time delay the part of the first audio element and/or second audio element delivered to the listener 4 from the third virtual source location 3. The gain blocks 14 vary the gain of the part of the first audio element and/or second audio element delivered to the listener 4 from the third virtual source location 3.

The captured audio soundfields 10 are delivered to the listener 4 via the set of headphones 11.

The invention may be applied as a soundfield telephone system, in which the transmitting telephony device includes a soundfield microphone with which it captures all of the sound in the room in which it is placed including directional information. This soundfield telephone encodes the captured soundfield appropriately and transmits it over a telephony network to the receiving device which renders the captured soundfield to a listener over headphones using an HRTF-based virtualisation method.

With the invention the first virtual source location 1 and the second virtual source location 2 are perceived by the listener 4 as being located to the front of the listener 4. In an alternative arrangement where a talker to the north of the soundfield device may appear to emanate from in front of the listener 4, a talker to the east may appear to come from the listener's right while a talker to the west may appear to come from the listener's left, and a talker to the south appears to come from behind the listener 4. In such an alternative arrangement sound will not be clearly perceived to emanate from behind the listener 4in such a system because of the binaural front/back confusion effect, in which the interaural level difference (ILD) and interaural time difference (ITD) are identical for a sound emanating from the front and a sound emanating from behind, leaving only weak auditory cues caused by the pinnae to allow the listener 4 to distinguish front from back. The invention overcomes any such difficulties because both the first virtual source location 1 and the second virtual source location 2 are perceived by the listener 4 as being located to the front of the listener 4.

Furthermore, in such an alternative arrangement, a talker who appears to emanate from the listener's left or right side for long periods of time might seem unnatural to the listener if this situation extends for a long time. Human listeners prefer to look in the direction of a human talker in face-to-face interaction. In such an alternative arrangement the listener 4 will find it unnatural if a talker emanates from a location to one side for long periods of time, given that he or she is presented with an otherwise apparently natural acoustic environment. The invention overcomes any such difficulties because both the first virtual source location 1 and the second virtual source location 2 are perceived by the listener 4 as being located to the front of the listener 4.

The invention provides a soundfield teleconference system in which captured soundfields from multiple soundfield telephones are transmitted, possibly via a server, mixer or conference bridge, to a receiving device which renders them simultaneously over headphones using an HRTF-based virtualisation strategy. The invention offers the listener spatial context with which he or she may determine at which endpoint a particular talker is located. For example, in a conference consisting of two soundfield endpoints A and B and a binaural listener, the headphone virtualisation technique places the A soundfield in a zone at the virtual front left of the listener and B in a zone at the virtual front right. Thus, the listener is able to determine whether a talker is located at endpoint A or B by determining whether the talker appears to be emanating from front left or front right.

Figure 5:
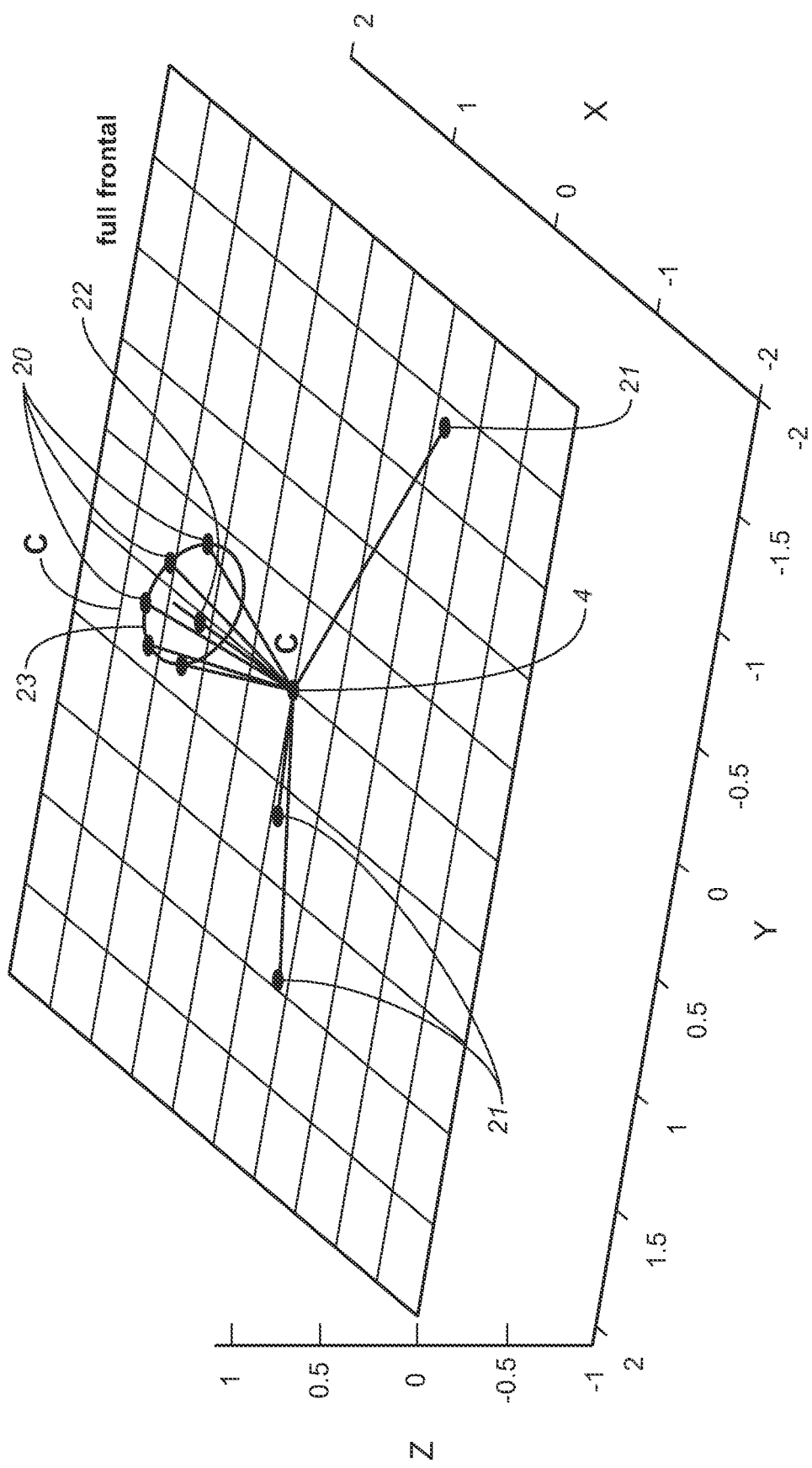
FIG. 5 is a perspective view of the location of a listener and a plurality of virtual source locations.

The invention presents a soundfield to a listener over headphones using HRTFs. With the invention predominantly HRTFs measured from frontal locations are used, so that all sounds perceived by the listener appear to emanate from the front. The invention maintains a high degree of spatial fidelity and naturalness. When applied in a soundfield telephone system, the invention mitigates against the above-mentioned issue of discomfort by avoiding presenting talkers from side locations. The invention also allows a target rendering zone which is skewed away from front dead centre in a particular direction, for example to the left upwards The invention has been described above with reference to FIGS. 2 to 4 in relation to two virtual source locations 1, 2 perceived by the listener 4 as being located to the front of the listener 4, and one virtual source location 3 perceived by the listener 4 as being located to the rear/side of the listener 4. However, it will be appreciated that the invention is suitable for use with a plurality of virtual source locations 20 perceived by the listener 4 as being located to the front of the listener 4, and/or with a plurality of virtual source locations 21 located to the rear/side of the listener 4, as illustrated in FIG. 5.

Each of the virtual source locations 20 perceived by the listener 4 as being located to the front of the listener 4 is represented as a point on a single virtual curve 23. The virtual curve 23 is located in the second vertical plane F-F. As illustrated in FIG. 5, the virtual curve 23 is a closed curve, and the centre 22 of the closed curve 23 lies substantially on the front virtual axis C-C. The closed curve 23 may be a circle or an ellipse.

Figure 6:
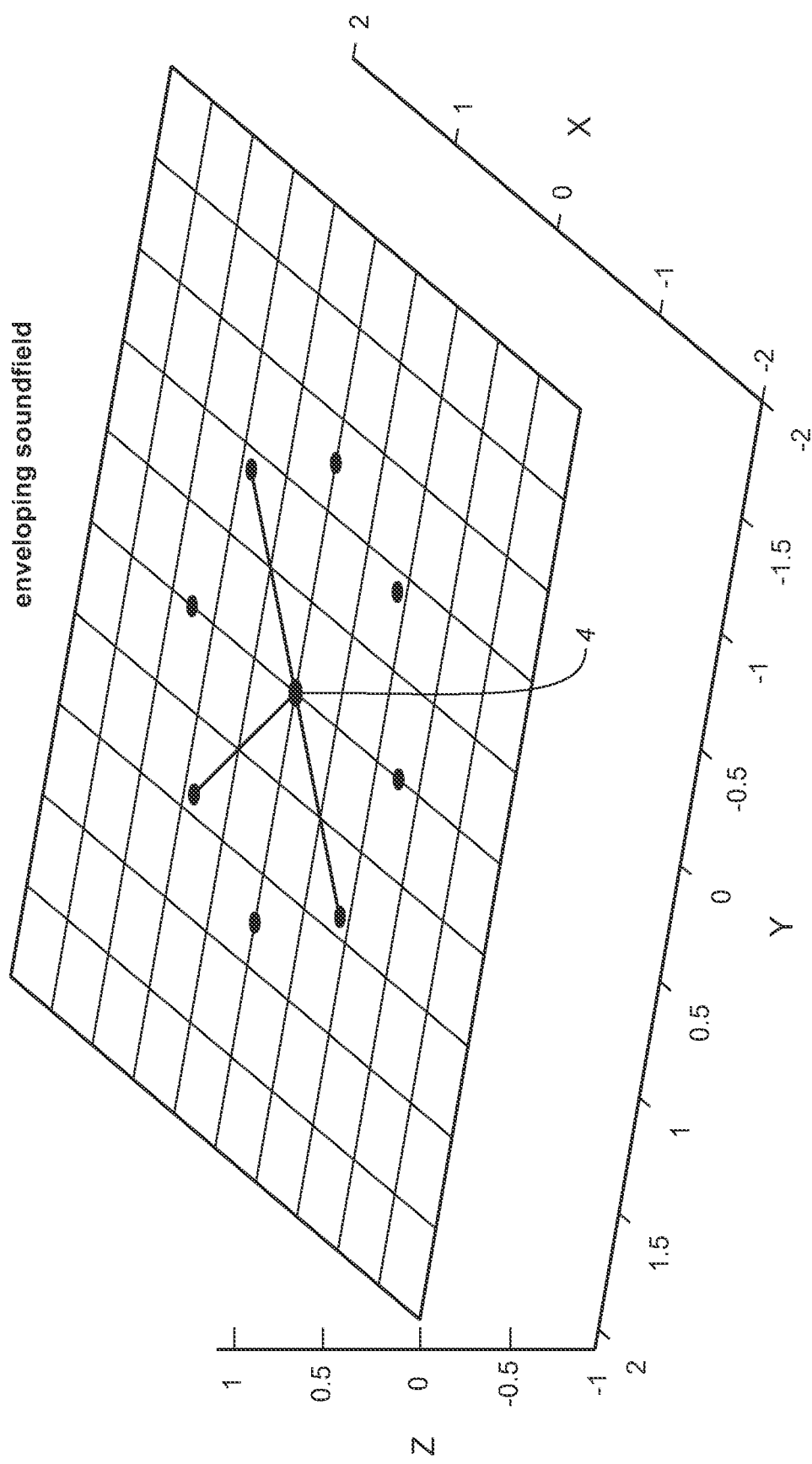
FIG. 6 is a perspective view of the location of a listener and a plurality of virtual source locations.

The invention results in full frontal rendering. The soundfield is rendered using the set of HRTFs from locations describing a closed path 23 in front of the listener 4, instead of a closed path encircling the listener 4, as illustrated in FIG. 6.

In one embodiment of the full frontal rendering invention, the soundfield is decoded to virtual speaker feeds $S_1$, $S_2$, ... $S_N$ as discussed above. Instead of processing the virtual speaker feeds with HRTFs measured on the horizontal plane from azimuth angles $\phi_1$, $\phi_2$, ... $\phi_N$, as illustrated in FIG. 6, the feeds are processed with a series of HRTFs measured on the closed path 23 in front of the user, as illustrated in FIG. 5.

In the example of FIG. 5, the locations of the N HRTFs used to process the speaker feeds may describe a circle in front of the user, shown as a series of blue crosses 23 in FIG. 5. The Cartesian location of the point $D_i$ that the HRTFs should be measured from to render a virtual speaker feed $S_i$ are given by the following formula, where the positive x axis C-C extends forward from the listener's nose, the positive y axis H-H extends out to the listener's left and the positive z axis I-I extends upwards. K is an arbitrary distance factor and $W_y$ describes the angle subtended at the base of the cone in degrees.

$$D_i = \begin{bmatrix} x_i \\ y_i \\ z_i \end{bmatrix} = \begin{bmatrix} \dfrac{K}{\tan\dfrac{\pi W_y}{90}} \\ K\sin\phi_i \\ K\cos\phi_i \end{bmatrix}$$

FIG. 5 illustrates full frontal rendering of a horizontal soundfield using HRTFs from a frontal cone and a series of rear/side reflections.

Any closed shape may be used for rendering the N virtual speaker feeds. For example, an ellipsoid may be preferred to a circle because it exaggerates the perceived elevation angles of the perceived rendered soundfield to maximize the listener's ability to separate talkers in the soundfield.

FIG. 1 shows the full frontal soundfield rendering topology of an embodiment of the full frontal rendering invention. Speaker feeds $S_1$, $S_2$ ... $S_N$ are rendered through HRTFs measured at positions $D_1$, $D_2$, ... $D_N$.

Artificial rear/side energy may be added to offset any potential unnatural acoustic situation caused by steering the whole soundfield to the front. This may be performed using a set of gains and delays so that the rear/side energy approximates the reflected energy field that would be received at the ears, where the listener is sitting in an echoic room, listening to the input scene through an open door.

As shown in FIG. 1, a second decode of the soundfield is performed to produce a second set of M virtual speaker feeds $Q_1$, $Q_2$, ... $Q_M$. Each of those feeds is delayed by a different time $T_1$, $T_2$, ... $T_M$ and gain $G_1$, $G_2$, ... $G_M$ is applied to produce M discrete reflection signals which are rendered through HRTFs measured from rear/side locations $R_1$, $R_2$, ... $R_M$, which may be seen marked with red crosses 21 in FIG. 5.

Figure 7:
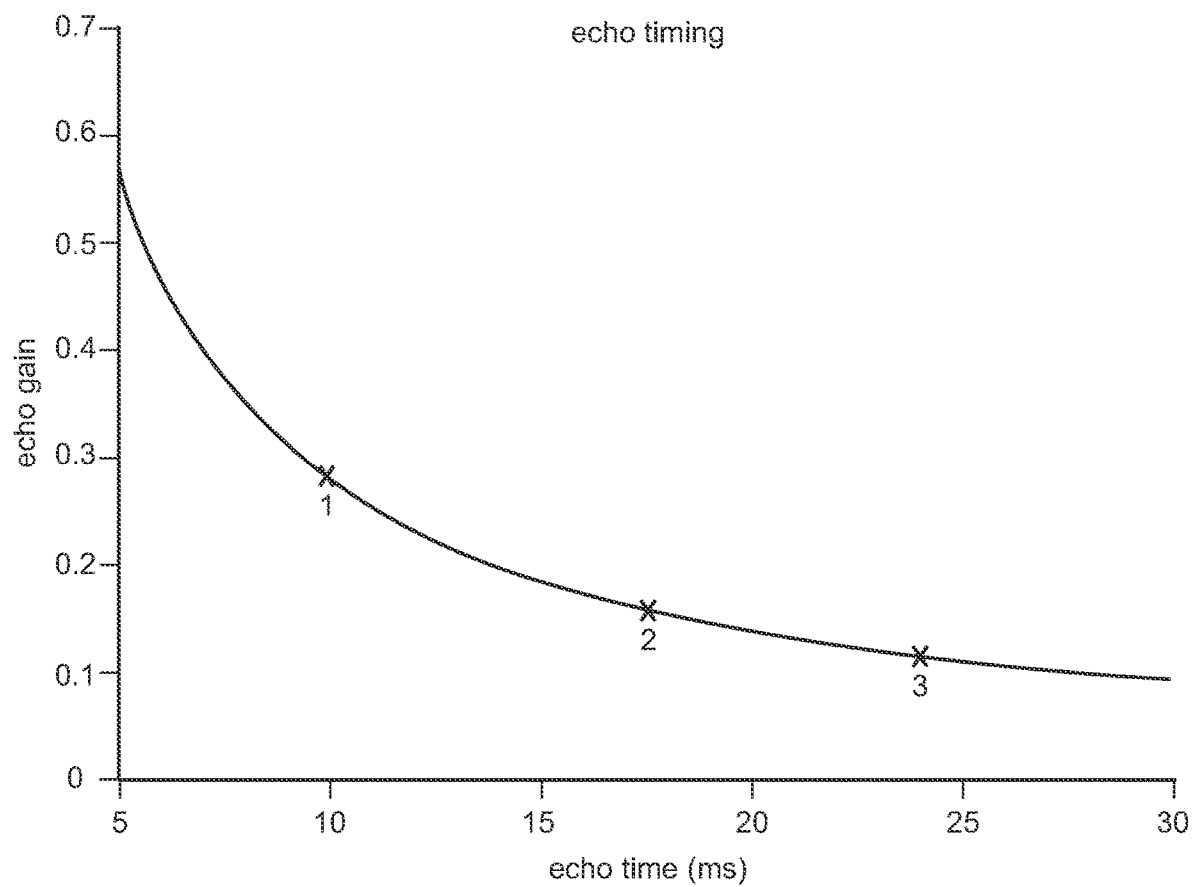
FIG. 7 is a graph of echo gain versus echo time.

The locations $R_1$, $R_2$, ... $R_M$ may be arbitrarily chosen from the rear/side hemisphere, for example on the horizontal plane behind the listener. $T_1$, $T_2$, ... $T_M$ may be in the range 5 to 30 ms so that they are not perceived as distinct acoustic events but are perceptually merged as reflections of the soundfield, for example using Haas's result. Further details on Haas's result may be found at Haas, H. "The Influence of a Single Echo on the Audibility of Speech", JAES Volume 20 Issue 2 pp. 146-159; March 1972. Since the sound pressure level drops inverse-proportionally with distance r from a sound source, the gains $G_1$, $G_2$, ... $G_M$ may be chosen to lie on a K/r curve, for arbitrary scale factor K, as shown in FIG. 7. Further details on the sound pressure level dropping inverse-proportionally with distance r from a sound source may be found at http://www.sengpielaudio.com/calculator-squarelaw.htm. It is also useful to normalize the sum of the gains so that a predictable total reflection gain $G_T$ is achieved:

$$\sum_i G_i = G_T$$

FIG. 7 illustrates the gain/time profile for reflections.

One method of finding a solution that fits the above criteria is to use an iterative approach. The following MATLAB code excerpt gives an example of such an approach.

```
fs = 48000;
min_echo_time = round(0.005*fs);
max_echo_time = round(0.030*fs);
times_echo = min_echo_time + (max_echo_time-
 min_echo_time)*(1:2:(2*M))/(2*M+1);
times_echo = times_echo + (rand(Necho,1)-0.5)*(max_echo_time-
 min_echo_time)/(1.5*M);
normalise = 1;
while (normalise)
 % calculate gains from times according to 1/r profile
 gains_echo = min_echo_time ./ times_echo;
 % normalise gains so they add up to 1
 gains_echo = gains_echo / sum(gains_echo);
 % generate corresponding time delays
 times_echo = round(min_echo_time ./ gains_echo);
 % ensure they are within the max echo time
 if (max(times_echo) > max_echo_time)
  times_echo = times_echo + (rand(Necho,1))*(max_echo_time-
   min_echo_time)/(1.5*M);
 else
  normalise = 0;
 end
end
```

The M-way reflection decode produces signals $Q_1$, $Q_2, \ldots Q_M$ using a playback matrix $P_Q$ in a similar manner to the main decode as follows.

$$\begin{bmatrix} Q_1 \\ Q_2 \\ \vdots \\ Q_M \end{bmatrix} = P_Q \begin{bmatrix} W \\ X \\ Y \end{bmatrix}$$

Figure 8:
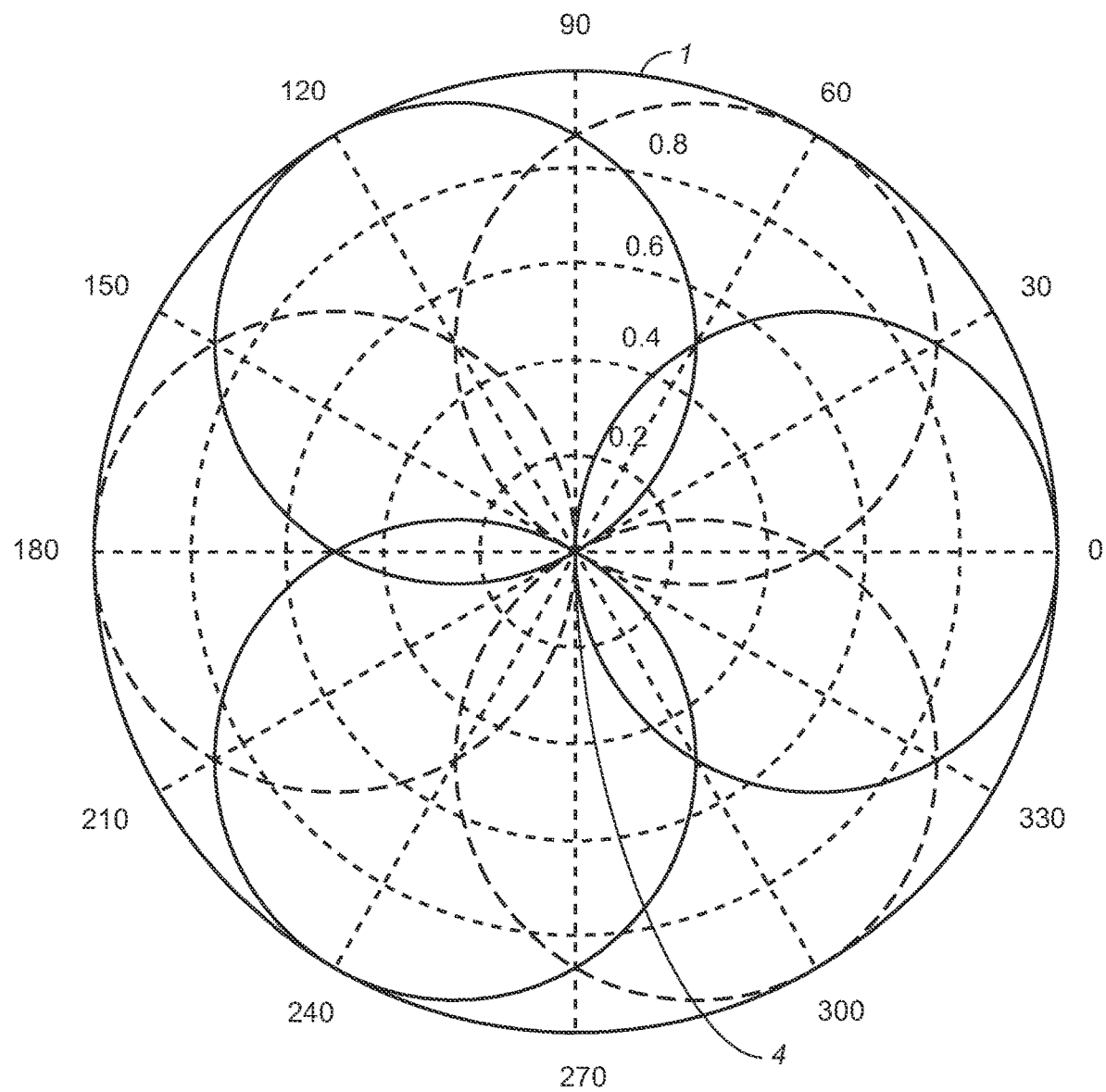
FIG. 8 is a plan view of a listener and virtual dipole microphone signals.

One way of calculating $P_Q$ is to derive a number of virtual dipole microphone signals, as shown in FIG. 8 and described by the following equation. This maximises the spatial diversity heard in the reflections by introducing out-of-phase components.

$$P_Q = \begin{bmatrix} 0 & \cos 0 & \sin 0 \\ 0 & \cos\frac{\pi}{M} & \sin\frac{\pi}{M} \\ \vdots & \vdots & \vdots \\ 0 & \cos\frac{\pi(M-1)}{M} & \sin\frac{\pi(M-1)}{M} \end{bmatrix}$$

This may alternatively be expressed as:

$$Q_i = X\cos\frac{\pi i}{M} + Y\sin\frac{\pi i}{M}$$

FIG. 8 illustrates dipole decoding for reflections with negative lobes shown in dotted lines, positive lobes shown in solid lines.

Figure 9:
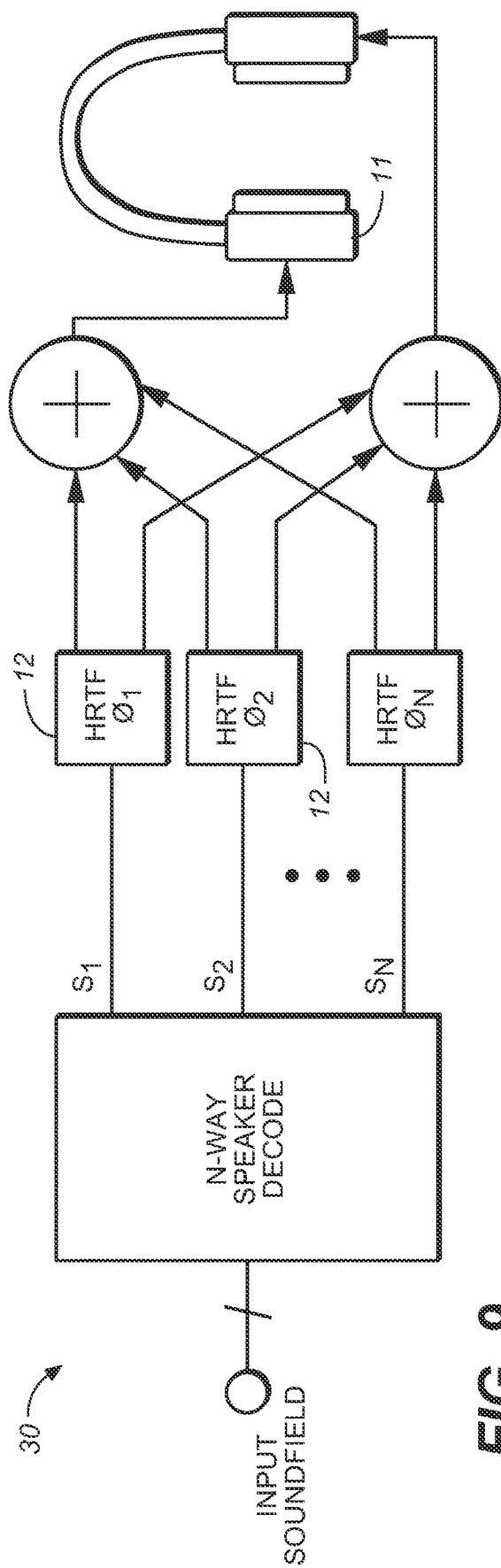
FIG. 9 is a schematic illustration of another system for rendering one or more captured audio soundfields to a listener according to the invention.

In FIGS. 9 and 10 there is illustrated another computer implemented system for rendering one or more captured audio soundfields to a listener 4 according to the invention, which is similar to the system of FIGS. 1 to 8, and similar elements in FIGS. 9 and 10 are assigned the same reference numerals.

In this case the delivery apparatus 30 is configured to deliver the one or more captured audio soundfields to the listener 4 with the first audio element perceived by the listener 4 as emanating from the first virtual source location 1, with the second audio element perceived by the listener 4 as emanating from the second virtual source location 2. The first virtual source location 1 and the second virtual source location 2 are perceived by the listener 4 as being located to the front of the listener 4. There is no audio source delivering audio from the rear/side of the listener 4. In particular the delivery apparatus 30 does not deliver the one or more captured audio soundfields to the listener 4 with part of the first/second audio element delivered to the listener 4 from a virtual source location located to the rear/side of the listener 4.

In this case the delivery apparatus 30 does not comprise time delay blocks and does not comprise gain blocks.

The delivery apparatus 30 uses the HRTFs to render the soundfield to the listener 4. The soundfield is decoded for a virtual speaker array consisting of N speakers and then use HRTFs from N discrete locations to render each of these virtual speaker feeds to the headphones 11, as shown in FIG. 9. FIG. 9 illustrates the headphone virtualisation by virtual speaker decoding feeding discrete HRTFs.

The embodiments of the invention described previously with reference to the accompanying drawings comprise a computer system and/or processes performed by the computer system. However, the invention also extends to computer programs products comprising computer program code capable of causing a computer system to perform a method as described above when the computer program product is run on a computer system, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The computer program product may be embodied on a record medium, or on a carrier signal, or on a read-only memory. The carrier may comprise a storage medium such as ROM, such as a CD-ROM, or magnetic recording medium, such as a floppy disk or hard disk. The carrier may be an electrical or optical signal which may be transmitted via an electrical or an optical cable or by radio or other means.

In view of the above and the various embodiments as recited before, the invention also leads to a method of rendering at least one soundfield to a listener via binaural headphones, wherein the at least one soundfield includes sound information and spatial location information related to at least one sound source, the method comprising:

generating a number of virtual speaker feeds from each soundfield;

transforming the number of virtual speaker feeds into binaural headphone feeds;

rendering the at least one soundfield to the listener by feeding the binaural headphone feeds to the headphones, wherein the binaural headphone feeds are configured to have the listener perceive each soundfield as originating from a region exclusively in front of the listener.

Using this concept, at least two soundfields can be rendered to the listener via said binaural headphone feeds, wherein said binaural headphone feeds are further configured to have the at least two soundfields perceived by the listener as originating from different regions, the different regions located exclusively in front of the listener.

The different regions can include disjunct or partially overlapping regions.

One or more or all of said soundfields is (respectively are) preferably embodied as (an) isotropic soundfield(s) including said sound information and spatial location information.

In contrast to a spatial object coding and rendering technique which includes a number of audio playback channels and positioning the objects at any (virtual) location which can be rendered by driving any (weighted) combination of said audio channels, the current invention relies on rendering a transformed soundfield to the listener via the binaural headphone feeds; i.e. without employing spatial object-based rendering techniques for placing said objects in a spatial audio scene. The initial (one or more) soundfield is transformed into said binaural headphone feeds while keeping spatial information included in the initial soundfield. The transformation will, however, map initial spatial locations included in the initial soundfield which are located beside or behind the listener to spatial locations exclusively in front of the listener.

One advantage is that the one or more (transformed) soundfields can be rendered exclusively in front of the listener without losing (too much) spatial effect of the initial soundfield—even when one is not relying on individual signals and locations corresponding to each of the sound sources as positioned in an original room.

In this context, it can be mentioned that e.g. "Ambisonics" is a series of recording and replay techniques using multi-channel mixing technology that can be used live or in the studio to generate 2D or 3D soundfields from stereo or spatial audio signals. Such techniques can be advantageously employed with the current invention.

In a further advantageous embodiment, the number of virtual speaker feeds includes N virtual speaker feeds configured for playback over N speakers arranged around the listener in a horizontal plane, the N speakers preferably arranged at the circumference of a circle, and transforming the N virtual speaker feeds into the binaural headphone feeds includes transforming the N virtual speaker feeds into an array of virtual speakers feeds configured for playback over an array of virtual speakers arranged in a vertical plane located in front of the listener, the array of virtual speakers preferably arranged at the circumference of a circle, the circle arranged in the vertical plane.

The array of virtual speaker feeds can include N virtual speaker feeds and the array of virtual speakers can then include N virtual speakers.

In any of the before-mentioned embodiments, transforming the number of virtual speaker feeds into the binaural headphone feeds can include applying Head-Related Transfer Functions (HRTF) to the number of virtual speaker feeds.

Said Head-Related Transfer Functions are advantageously adapted to obtain said perceived origin of each rendered soundfield being located exclusively in front of the listener.

Furthermore, in any of the above-referenced embodiments, the at least one soundfield can be present in an encoded form. In such case, the step of generating a number of virtual speaker feeds from such soundfield includes decoding said encoded soundfield and generating the number of virtual speaker feeds from the decoded soundfield.

The invention—as outlined above in various embodiments—makes provision for rendering the (original, at least one) soundfield exclusively in front of the listener—as per the listener's perception, even if said (original) soundfield includes location corresponding to a position beside and/or behind the listener.

In other words, sound sources included in the soundfield and having a location information which would have such sound source rendered beside or behind the listener will be rendered exclusively at a perceived origin exclusively in front of the listener—by applying the method according to the invention.

This is done to avoid a psychologically unpleasant situation for the listener—as it has been shown that audio signals rendered "out of natural sight" of the listener, e.g. beside or behind the listener, might cause an uneasy feeling. This should be avoided specifically in business teleconferencing situations. To that end, the present invention suggests to render the (initial) soundfield exclusively at a region perceived by the listener to be located in front of him. This is done by generating said virtual speaker feeds and transforming the virtual speaker feeds into the binaural headphone feeds, wherein the transformation re-maps "beside" and "behind" locations to "in front of" rendering positions.

If, e.g. the virtual speaker feeds are configured for playback over virtual speakers arranged around the listener in a horizontal plane, initial sound source locations and movements corresponding to locations and movements beside and behind the listener will be rendered at and perceived as front positions respectively as vertical movements occurring in front of the listener in e.g. a vertical plane. This can be imagined e.g. by mapping a virtual rendering speakers' arrangement which horizontally encircles the listener to a vertical virtual rendering speakers' arrangement located in front of the listener: "The original rendering speakers' plane is tilted by e.g. 90 degrees and moved to a position in front of the listener."

The invention is not limited to the embodiments hereinbefore described, with reference to the accompanying drawings, which may be varied in construction and detail.

It is claimed:

1. A method for binaurally rendering a soundfield, the method comprising:
   receiving, from a mixer, N virtual loudspeaker feeds representing the soundfield for binaural rendering, wherein N>1; and
   rendering, using one or more head related transfer functions (HRTFs), a stereo binaural signal, wherein the rendering comprises transforming the N virtual loudspeaker feeds into the stereo binaural signal by determining N signals for each of left and right ears and generating the stereo binaural signal by summing the N signals for each of the left and right ears, wherein the stereo binaural signal comprises left and right output signals, and wherein the rendering further comprises applying a plurality of time delays.

2. The method of claim 1, wherein the soundfield is a B-Format soundfield.

3. The method of claim 1, wherein the soundfield is an Ambisonics soundfield.

4. The method of claim 1, wherein the soundfield comprises an audio object and direction information pertaining to the audio object.

5. A non-transitory computer program product storing a computer program, the computer program when executed by a device including a processor and a memory performs the method of claim 1.

6. A system for binaurally rendering a soundfield, the system comprising:
- a processor configured to:
- receive, from a mixer, N virtual loudspeaker feeds representing the soundfield for binaural rendering, wherein N>1; and
- render, using one or more head related transfer functions (HRTFs), a stereo binaural signal, wherein the rendering configures the processor to transform the N virtual loudspeaker feeds into the stereo binaural signal by determining N signals for each of left and right ears and generating the stereo binaural signal by summing the N signals for each of the left and right ears, wherein the stereo binaural signal comprises left and right output signals, and wherein the rendering further transforming configures the processor to apply a plurality of time delays.

* * * * *

UNITED STATES PATENT AND TRADEMARK OFFICE
CERTIFICATE OF CORRECTION

| | | |
|---|---|---|
| PATENT NO. | : 12,207,073 B2 | Page 1 of 1 |
| APPLICATION NO. | : 18/469498 | |
| DATED | : January 21, 2025 | |
| INVENTOR(S) | : Cartwright et al. | |

It is certified that error appears in the above-identified patent and that said Letters Patent is hereby corrected as shown below:

In the Claims

Column 19, Line 19, Claim 6, after "further", delete "transforming"

Signed and Sealed this
Eleventh Day of November, 2025

John A. Squires
*Director of the United States Patent and Trademark Office*